(12) United States Patent
Lu et al.

(10) Patent No.: US 11,566,417 B2
(45) Date of Patent: Jan. 31, 2023

(54) MODULAR INTEGRATED CONSTRUCTION JOINT

(71) Applicant: Nano and Advanced Materials Institute Limited, Hong Kong (HK)

(72) Inventors: Xin Kun Lu, Hong Kong (HK); Su Ping Bao, Hong Kong (HK); Honggang Zhu, Hong Kong (HK); Man Lung Sham, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 253 days.

(21) Appl. No.: 17/070,917

(22) Filed: Oct. 14, 2020

(65) Prior Publication Data

US 2022/0112710 A1    Apr. 14, 2022

(51) Int. Cl.
| | |
|---|---|
| *E04B 1/68* | (2006.01) |
| *E04B 1/94* | (2006.01) |
| *E04B 1/78* | (2006.01) |
| *B32B 5/32* | (2006.01) |
| *C08K 3/016* | (2018.01) |
| *C08J 9/32* | (2006.01) |
| *C08J 9/00* | (2006.01) |

(52) U.S. Cl.
CPC .............. *E04B 1/6803* (2013.01); *B32B 5/32* (2013.01); *C08J 9/0095* (2013.01); *C08J 9/32* (2013.01); *C08K 3/016* (2018.01); *E04B 1/6801* (2013.01); *E04B 1/6806* (2013.01); *E04B 1/78* (2013.01); *E04B 1/946* (2013.01); *E04B 1/948* (2013.01); *B32B 2255/26* (2013.01); *B32B 2266/0278* (2013.01); *B32B 2266/08* (2013.01); *B32B 2307/3065* (2013.01); *C08J 2201/022* (2013.01); *C08J 2205/052* (2013.01); *C08J 2375/04* (2013.01); *E04B 2001/6818* (2013.01)

(58) Field of Classification Search
None
See application file for complete search history.

(56) References Cited

U.S. PATENT DOCUMENTS

| | | | |
|---|---|---|---|
| 9,670,666 B1 | 6/2017 | Witherspoon et al. | |
| 2018/0345059 A1* | 12/2018 | Hulteen | ................. A62C 2/065 |
| 2019/0266335 A1* | 8/2019 | Robinson | ............ G06F 12/1425 |

FOREIGN PATENT DOCUMENTS

EP        2907832 A1    8/2015

OTHER PUBLICATIONS

Office Action of corresponding China Patent Application No. 202011605021.8 dated Dec. 7, 2022.

\* cited by examiner

*Primary Examiner* — Chinessa T. Golden
(74) *Attorney, Agent, or Firm* — Idea Intellectual Limited; Margaret A. Burke; Sam T. Yip (57) ABSTRACT

The invention relates to a modular integrated construction joint which includes a first building module, a second building module or a structural wall and a joint between the first building module and the second building module or structural wall. The joint includes a flexible seamless stitching system, which provides a long-term firestop, smokestop and waterproof for the joint cavity in-between modules in modular integrated construction (MiC).

18 Claims, 8 Drawing Sheets

MODULAR INTEGRATED CONSTRUCTION JOINT

FIELD OF THE INVENTION

The present invention relates generally to a modular integrated construction joint. More specifically, the modular integrated construction joint includes a seamless stitching system, which provides a long-term firestop, smokestop and waterproof for the joint cavity in-between modules in modular integrated construction (MiC) in building.

BACKGROUND

Modular integrated construction (MiC) is an innovative construction method in which free-standing volumetric modules (with finishes, fixtures, fittings, etc.) are manufactured and assembled in an accredited fabrication facility, and then transported to and installed on site to form a building. Compared to conventional buildings, there are more constructions joints with potentially large movement in the MiC building, such as module-to-module joint cavity and module-to-wall joint cavity. When water flows through these joints, it would accelerate the corrosion of steel walls and columns, making the buildings unsafe. Therefore, waterproofness of these joint cavities is essential to maintain the integrity and safety of buildings.

There are lots of expansion constructions joints with potentially large movement (at least ±10%) in MiC, and waterproofing materials applied to these expansion joints will subject to frequent cyclic loading due to the relative movement of the modules. Such movement imposes cyclic deformation in the waterproofing materials, which may cause large changes in rate and amplitude. Cyclic movement of the joint cavity may cause damage to the waterproofing system and make the building envelopes leaky. At present, flexible sheet waterproofing membranes are widely used in the MiC buildings in Singapore for waterproofing of joints. Generally, these sheet membranes can be applied directly to a substrate, but they may not fit certain areas. Instead, the sheet membranes must be cut into pieces and pasted together to fit the size of space, and special attention should be paid to the seams. Also, in view of the need to combine different sizes of paper, seams between each of the sheets must be carefully sealed to prevent penetration by water. However, these seams or joints between the sheet membranes usually delaminate after long-time service under cyclic movement, resulting in serious water leakage from the seams or joints. Therefore, there is a need in the art to manufacture a seamless waterproofing system with high movement accommodation capability, good adhesion and high water resistance for joints between the modules.

In addition, fire-rated materials are also required for the joint cavity to prevent fire and smoke from spreading through the joint cavities, which also has high flexibility, strong adhesion and good movement accommodation capability to accommodate potential relative movement between the modules, and therefore it can be seamlessly filled in the joints and provide good firestop and smokestop.

U.S. Pat. No. 8,578,672[1] discloses a backer rod adapted for forming a fire-resistant seal within a construction joint. The backer rod may include an elongated tube defining a total assembly volume and a hollow interior, and a core disposed within the hollow interior. The tube is formed of a combustible foam plastic which disintegrates when exposed to fire. The core material is expandable when exposed to fire, such that the core has an intumescent expansion factor sufficient to expand to a volume beyond the total assembly volume. However, there are lots of voids in the backer rod, which cannot effectively prevent the penetration of water and the spread of smoke.

U.S. Pat. Nos. 9,644,368[2] and 8,739,495[3] disclose a fire- and water-resistant expansion joint system including a compressed lamination of fire retardant infused open celled foam, one coat of an elastomeric waterproof or water resistant material on the lamination, and another coat of an intumescent material on an opposing surface of the lamination, thereby providing fire resistance in one direction and water resistance in an opposite direction. The intumescent material may be further coated with a similar elastomeric material, thereby providing fire resistance in one direction and water resistance in both directions. In the alternative, the compressed lamination may comprise first and second opposing layers of intumescent material thereon each having a respective layer of elastomeric material to provide both water resistance and fire resistance in both directions.

U.S. Pat. No. 9,206,596[4] discloses an expansion joint seal system which provides the fire protection of an intumescent to the exposed ends of construction panels while providing an elastic seal to protect the construction panels against contaminants and temperature fluctuations.

U.S. Ser. No. 10/179,993[5] discloses a fire- and/or water-resistant expansion joint system for installation into building joints in vertical and horizontal configurations, which can be used for either an inside or outside corner. The expansion joint system includes a core having a fire retardant therein and a water-resistant layer disposed on the core to facilitate the compression of the expansion joint system when installed between substrates. The system can be delivered to a job site in a pre-compressed state ready for installation into the building joint.

U.S. Ser. No. 10/081,939[6], U.S. Ser. No. 10/087,620[7], U.S. Ser. No. 10/280,611[8], U.S. Ser. No. 10/323,408[9], U.S. Ser. No. 10/533,315[10], US2019/0242117[11], US2019/0249420[2], US2019/0249422[13] and US2019/0249423[14] disclose a fire-resistant and water-resistant expansion joint seal, including one or more foam members and a plurality of fire retardant members, which may be intumescent members, interspersed within the foam member or members to provide a spring recovery force and fire resistance.

However, all expansion seal systems described in the above US patents and published patent applications are finished products manufactured by factories, also called ready-to-apply products, which can be delivered to a job site in a pre-compressed state ready for installation into the building joint. These ready-to-apply products are also not made specifically to fit certain areas, so they must be cut in pieces and pasted together to suit the size of space and a special attention to the seams is required. The seams between each sheet of the above products must be carefully sealed to prevent water penetration, smoke leakage and fire spread. Seams or joints usually delaminate after long-time service under cyclic movement, resulting in serious water and smoke leakage from the seams or joints, and also cannot inhibit the spread of fire. Therefore, there is a need for a modular integrated construction joint, which has good fire and smoke resistance and can inhibit fire and smoke spread through the joints, as well as having high waterproof.

The following reference list sets forth the literatures mentioned in this section, which are incorporated herein by reference in their entirety:

1. U.S. Pat. No. 8,578,672 B2 (published on 2013 Nov. 12) by Tremco Inc.

2. U.S. Pat. No. 9,644,368 B1 (published on 2017 May 9) by Emseal Joint Systems Ltd.
3. U.S. Pat. No. 8,739,495 B1 (published on 2014 Jun. 3) by Emseal Joint Systems Ltd.
4. U.S. Pat. No. 9,206,596 B1 (published on 2015 Dec. 8) by Schul International Company, LLC.
5. U.S. Ser. No. 10/179,993 B2 (published on 2019 Jan. 15) by Emseal Joint Systems Ltd.
6. U.S. Ser. No. 10/081,939 B1 (published on 2018 Sep. 25) by Schul International Company, LLC.
7. U.S. Ser. No. 10/087,620 B (published on 2018 Oct. 2) by Schul International Company, LLC.
8. U.S. Ser. No. 10/280,611 B1 (published on 2019 May 7) by Schul International Company, LLC.
9. U.S. Ser. No. 10/323,408 B1 (published on 2019 Jun. 18) by Schul International Company, LLC.
10. U.S. Ser. No. 10/533,315 B2 (published on 2020 Jan. 14) by Schul International Company, LLC.
11. US 20190242117 A1 (published on 2019 Aug. 8) by Schul International Company, LLC.
12. US 20190249420 A1 (published on 2019 Aug. 15) by Schul International Company, LLC.
13. US 20190249422 A1 (published on 2019 Aug. 15) by Schul International Company, LLC.
14. US 20190249423 A1 (published on 2019 Aug. 15) by Schul International Company, LLC.

SUMMARY OF THE INVENTION

Accordingly, a first aspect of the present invention is to provide a modular integrated construction joint, including a first building module, a second building module or a structural wall, and a joint between the first building module and the second building module or structural wall including a flexible seamless stitching system. The flexible seamless stitching system has high fire resistance and smoke resistance in one direction and high water resistance in an opposite direction, including an injectable intumescent firestop foam with a closed cell structure, where the flexible intumescent firestop foam has a filling depth of at least 30 mm, and the intumescent firestop foam has a thermal conductivity in a range of 0.03-0.08 W/(m·K); a flexible moisture-curable smokestop joint sealant on top of the firestop foam with a fracture elongation of at least 700%, where the smokestop joint sealant has a filling depth that is at least half of the joint width, a tensile strength of at least 1.5 MPa, and a tensile adhesion strength of at least 0.5 MPa; and a liquid-applied waterproof coating disposed on the joint sealant, where the liquid-applied waterproof coating has a fracture elongation of at least 400%, a tensile strength of at least 1.5 MPa, and a tensile adhesive strength of at least 0.8 MPa. The seamless stitching system has a movement accommodation capability of approximately 20% to 50%, and the flexible seamless stitching system can accommodate an irregular joint surface.

In a first embodiment of the first aspect of the present invention, the flexible intumescent firestop foam is a two-component injectable/spreadable, halogen-free, water-blown, flame-retardant and flexible polyurethane foam.

In a second embodiment of the first aspect of the present invention, the flexible intumescent firestop foam includes a flame retardant polyol mixture and an isocyanate compound.

In a third embodiment of the first aspect of the present invention, the isocyanate compound is selected from one or more of aromatic polyisocyanates, aliphatic polyisocyanates, cycloaliphatic polyisocyanates, heterocyclic polyisocyanates, toluene diisocyanate (TDI), methylene diphenyl diisocyanate (MDI), or any combination thereof; and where the isocyanate compound has an NCO content of about 15 to 50 wt %.

In a fourth embodiment of the first aspect of the present invention, the polyol mixture includes 100 parts by weight of polyether polyol; 1 to 5 parts of water; 30 to 150 parts of flame retardant agent; 0 to 10 parts of thermal insulation filler; 2 to 6 parts of chain extender; 0.1 to 1.0 parts of silicon foam stabilizer; 0.3 to 1.0 parts of UV absorber; 0.1 to 5 parts of thermal stabilizer; and 0.1 to 3.0 parts of catalyst.

In a fifth embodiment of the first aspect of the present invention, the polyether polyol comprises a hydroxyl value of 20 to 60 mg KOH/g.

In a sixth embodiment of the first aspect of the present invention, the flame retardant agent infused into the foam is selected from one or more of expanded graphite, magnesium hydroxide, ammonium polyphosphate, aluminum oxides, hydroxides, iron compounds, molybdenum trioxide or mixtures, nitrogen-based compounds, water-based aluminum trihydrate, or a combination thereof.

In a seventh embodiment of the first aspect of the present invention, the thermal insulation filler comprises hollow glass beads, hollow ceramic beads and silica aerogel powder.

In an eighth embodiment of the first aspect of the present invention, the chain extender is a low-molecular-weight glycol selected from 1,4-butanediol, propylene glycol, or diethylene glycol.

In a ninth embodiment of the first aspect of the present invention, the catalyst comprises metallic compounds and tertiary amines.

In a tenth embodiment of the first aspect of the present invention, both the smokestop joint sealant and the liquid-applied waterproof coating further include a moisture-curable liquid polymer resin with a viscosity ranging from 10,000 to 60,000 mPa·s; a plasticizer; a nano filler; an UV absorber; a thermal stabilizer; a moisture scavenger; an adhesion promoter; and a catalyst.

In an eleventh embodiment of the first aspect of the present invention, the moisture-curable liquid polymer resin is selected from one or more of silane terminated polyurethane prepolymer, silylated polyether prepolymer, or a combination thereof.

In a twelfth embodiment of the first aspect of the present invention, the nano-filler comprises an organic surface-treated calcium carbonate nanoparticle.

In a thirteenth embodiment of the first aspect of the present invention, the moisture scavenger is selected from one or more of vinyltrimethoxysilane, vinyltriethoxysilane, or a combination thereof.

In a fourteenth embodiment of the first aspect of the present invention, the adhesion promoter is selected from one or more of (3-aminopropyl) trimethoxysilane, (3-aminopropyl) triethoxysilane, (3-Glycidyloxypropyl) trimethoxysilane, (3-Glycidyloxypropyl) triethoxysilane, N-2-aminoethyl-3-aminopropyltrimethoxysilane, N-2-aminoethyl-3-aminopropyltriethoxysilane, or a combination thereof.

In a fifteenth embodiment of the first aspect of the present invention, the flexible intumescent firestop foam has a density in a range of 0.05 g/cm$^3$ to 0.16 g/cm$^3$.

In a sixteenth embodiment of the first aspect of the present invention, the seamless stitching system resists to 0.5 MPa of water pressure for over 72 hours without water leakage, and is capable of withstanding flame temperature of over 600° C. for more than two hours, and withstanding flame temperature of over 1000° C. for more than one hour.

In a seventeenth embodiment of the first aspect of the present invention, the irregular surface comprises corner, joints, or any shape of surface.

As a second aspect of the present invention, the present invention provides a modular integrated construction joint, including a first building module, a second building module or a structural wall, and a joint between the first building module and the second building module or structural wall including a flexible seamless stitching system. The flexible seamless stitching system has high water resistance in one direction and high fire resistance and smoke resistance in both directions, including a first injectable intumescent firestop foam with a closed cell structure, where the flexible intumescent firestop foam has a filling depth of at least 30 mm, and the intumescent firestop foam has a thermal conductivity in a range of 0.03-0.08 W/(m·K); a second injectable intumescent firestop foam with a closed cell structure, where the flexible intumescent firestop foam has a filling depth of at least 30 mm, and the intumescent firestop foam has a thermal conductivity in a range of 0.03-0.08 W/(m·K); a flexible moisture-curable smokestop joint sealant between the first and second flexible intumescent firestop foam, where the first flexible intumescent firestop foam, the joint sealant, and the second flexible intumescent firestop foam are arranged from top to bottom, and where the smokestop joint sealant has a fracture elongation of at least 700%, a filling depth that is at least half of the joint width, a tensile strength of at least 1.5 MPa, and a tensile adhesion strength of at least 0.5 MPa, and a liquid-applied waterproof coating disposed on top of the first flexible intumescent firestop foam, where the liquid-applied waterproof coating has a fracture elongation of at least 400%, a tensile strength of at least 1.5 MPa of tensile strength, and a tensile adhesive strength of at least 0.8 MPa. The seamless stitching system has a movement accommodation capability of approximately 20% to 50%, and the flexible seamless stitching system can accommodate an irregular joint surface.

As a third aspect of the present invention, the present invention provides a modular integrated construction joint, including a first building module, a second building module or a structural wall, and a joint between the first building module and the second building module or structural wall including a flexible seamless stitching system. The flexible seamless stitching system has high fire resistance in one direction, firestop in the core and high water resistance in an opposite direction, including a flexible moisture-curable smokestop joint sealant with a fracture elongation of at least 700%, where the smokestop joint sealant has a filling depth that is at least half of the joint width, a tensile strength of at least 0.5 MPa, and a tensile adhesion strength of at least 1.5 MPa; an injectable intumescent firestop foam with a closed cell structure on top of the joint sealant, where the flexible intumescent firestop foam has a filling depth of at least 30 mm, and the intumescent firestop foam has a thermal conductivity in a range of 0.03-0.08 W/(m·K); and a liquid-applied waterproof coating disposed on surface of the injectable intumescent firestop foam, where the liquid-applied waterproof coating has a fracture elongation of at least 400%, a tensile strength of at least 1.5 MPa of tensile strength, and a tensile adhesive strength of at least 0.8 MPa. The seamless stitching system has a movement accommodation capability of approximately 20% to 50%, and the flexible seamless stitching system can accommodate an irregular joint surface.

The present invention provides a modular integrated construction joint, which has good fire and smoke resistance and can inhibit fire and smoke spread through the joints, as well as having high flexibility, strong adhesion, excellent durability, good movement accommodation capability to accommodate the potential relative movement between the modules and excellent waterproof.

The modular integrated construction joint includes a seamless stitching system, which has the following advantages: (1) the seamless stitching system can provide a long-term firestop, smoke and waterproof protection the joint cavity (e.g. module-to-module joint cavity, module-to-wall joint cavity) in modular integrated construction; (2) The seamless stitching system for modular integrated construction has high flexibility, strong adhesion and good movement accommodation capability to accommodate the potential relative movement between the modules; (3) the seamless stitching system can resist to 5 bar water pressure for 72 hours without water leakage; and (4) the seamless stitching system is capable of withstanding flame temperature of over 600° C. for more than two hours, and withstanding flame temperature of over 1000° C. for more than one hour. It is still effective to provide fire, smoke and water resistance even after 2500 hours accelerated weather test.

BRIEF DESCRIPTION OF THE DRAWINGS

The present invention will be more readily understood from the following description of the embodiments thereof given, by way of example only, with reference to the accompying drawings, in which.

DETAILED DESCRIPTION

The present invention will be described in detail through the following embodiments with appending drawings. It should be understood that the specific embodiments are provided for an illustrative purpose only, and should not be interpreted in a limiting manner. Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features. Other aspects and advantages of the invention will be apparent to those skilled in the art from a review of the ensuing description.

The present invention provides a modular integrated construction joint, including a first building module, a second building module or a structural wall and a joint between the first building module and the second building module or structural wall including a flexible seamless stitching system. The flexible seamless stitching system has high fire resistance and smoke resistance in one direction and high water resistance in an opposite direction, including an injectable intumescent firestop foam with a closed cell structure, where the flexible intumescent firestop foam has a filling depth of at least 30 mm, and the intumescent firestop foam has a thermal conductivity in a range of 0.03-0.08 W/(m·K); a flexible moisture-curable smokestop joint sealant on top of the firestop foam with a fracture elongation of at least 700%, where the smokestop joint sealant has a filling depth that is at least half of the joint width, a tensile strength of at least 1.5 MPa, and a tensile adhesion strength of at least 0.5 MPa; and a liquid-applied waterproof coating disposed on the joint sealant, where the liquid-applied waterproof coating has a fracture elongation of at least 400%, a tensile strength of at least 1.5 MPa of tensile strength, and a tensile adhesive strength of at least 0.8 MPa. The seamless stitching system has a movement accommodation capability of approximately 20% to 50%, and the flexible seamless stitching system can accommodate an irregular joint surface.

In another embodiment, the flexible seamless stitching system has high water resistance in one direction and high fire resistance and smoke resistance in both directions, including a first injectable intumescent firestop foam with a closed cell structure, where the flexible intumescent firestop foam has a filling depth of at least 30 mm, and the intumescent firestop foam has a thermal conductivity in a range of 0.03-0.08 W/(m·K); a second injectable intumescent firestop foam with a closed cell structure, where the flexible intumescent firestop foam has a filling depth of at least 30 mm, and the intumescent firestop foam has a thermal conductivity in a range of 0.03-0.08 W/(m·K); a flexible moisture-curable smokestop joint sealant between the first and second flexible intumescent firestop foam, where the first flexible intumescent firestop foam, the joint sealant, and the second flexible intumescent firestop foam are arranged from top to bottom; and a liquid-applied waterproof coating disposed on top of the first flexible intumescent firestop foam. The smokestop joint sealant has a fracture elongation of at least 700%, a filling depth that is at least half of the joint width, a tensile strength of at least 1.5 MPa, and a tensile adhesion strength of at least 0.5 MPa. The liquid-applied waterproof coating has a fracture elongation of at least 400%, a tensile strength of at least 1.5 MPa of tensile strength, and a tensile adhesive strength of at least 0.8 MPa.

In yet another embodiment, the smokestop joint sealant and liquid-applied waterproof coating can be respectively constructed on both sides of the foam to form a sandwich structure, where the liquid-applied waterproof coating is disposed on surface of the firestop foam and the smokestop joint sealant is disposed on the surface of the firestop form opposing the waterproof layer, thereby providing fire resistance in one direction, firestop in the core and water resistance in the opposite direction.

In other embodiment, the flexible intumescent firestop foam is a two-compound composition including a flame retardant polyol mixture and an isocyanate compound. The polyol mixture includes 100 parts by weight of polyether polyol, 1-5 parts of water, 30-150 parts of flame retardant agent, 0-10 parts of thermal insulation filler, 2-6 parts of chain extender, 0.1-1.0 parts of silicon foam stabilizer, 0.3-1.0 parts of UV absorber, 0.1-5 parts of thermal stabilizer and 0.1-3.0 parts of catalyst. The isocyanate compound can react with the polyol mixture and form a foamy structure with closed cells to achieve good thermal insulation. The isocyanate compound is a compound having two or more isocyanate groups per molecule, including but not limited to aromatic polyisocyanates, aliphatic polyisocyanates, cycloaliphatic polyisocyanates, heterocyclic polyisocyanates, or a combination thereof. The isocyanate compound preferably includes toluene diisocyanate (TDI) prepolymer or methylene diphenyl diisocyanate (MDI) prepolymer. The isocyanate compound preferably has an NCO content of about 15-50 wt %.

In one embodiment, polyether polyol has a hydroxyl value of 20 to 60 mg KOH/g, preferably a hydroxyl value of 35 to 60 mg KOH/g, which can be applied to products such as soft polyurethane foam layers. The polyether polyol is selected from the following commercial products, including DEP-5631D, EP330N, 290E, etc.

Water is the most commonly used blowing agent for polyurethane. In the present disclosure, the water may be present in a preferred range of 1 to 5 parts by weight, preferably from 2 to 3 parts.

In one embodiment, flame retardant may be present in a preferred range of 30 to 100 parts by weight, preferably from 50 to 100 parts by weight. The flame retardant agent infused into the foam is selected from expanded graphite, magnesium hydroxide, intumescent ammonium polyphosphate, aluminum oxides and hydroxides, iron compounds, molybdenum trioxide or combinations thereof. For example, the flame retardant agent is a mixture of expanded graphite with 80-150 mesh and intumescent ammonium polyphosphate.

In one embodiment, thermal insulation filler is added to further improve the thermal insulation, which is selected from hollow glass beads, ceramic hollow beads and silica aerogel powder with 500-1250 mesh.

In one embodiment, some low molecular weight of glycols can act as an additive chain extender, such as 1,4-butanediol, propylene glycol and diethylene glycol, which are added that primarily serves as a spacer between neighboring poly isocyanates and decrease the hardness of self-foaming layers. The content of the chain extender is in a preferred range of 3 to 6 parts by weight.

In one embodiment, the content of foam stabilizer is in a preferred range of 0.1 to 5 parts by weight.

In one embodiment, the UV absorber can be any commercial UV absorber, such as TINUVIN® 234, TINUVIN® 326, TINUVIN® 327, TINUVIN® 329, TINUVIN® 360, TINUVIN® 460, TINUVIN® 477, TINUVIN® 770, TINUVIN® 384, TINUVIN® 1130, TINUVIN® 5050, TINUVIN® 5151, TINUVIN® 5060, or a combination thereof.

In one embodiment, the thermal stabilizer can be a commercial thermal stabilizer, such as TINUVIN® B75, Irgafos® 168 Irganox® 1010, Irganox® 1520, Irganox® B 225, Tinuvin® 765, Chinox® 7, Chinox® 168, and Chinox® TP-10.

In one embodiment, the catalyst includes metallic compounds and tertiary amines, where the metallic compounds are, for example, dibutyltin dilaurate (T-12), Stannous octoate (T-9), and Stannous oleate. The tertiary amines are, for example, triethylenediamine, triethylamine, tripropylamine, bis (dimethylaminoethyl) ether (A1), pentamethyl diethylenetriamine (PC-5) and N, N-dimethylcyclohexylamine (PC-8).

In other embodiment, flexible intumescent firestop foam is a halogen-free, water-blown, flame-retardant flexible polyurethane (PU) foam, which can be directly injected into a joint cavity and fully fill the joint to build a continue intumescent foamy layer with a good adhesion on substrates, and create a fire barrier for the joint cavity.

In the event of a fire or heat, the foamy layer will expand and self-extinguish, thus blocking the spread of fire. The resulting foam has a density of 0.05 g/cm$^3$ to 0.16 g/cm$^3$ with close cell. In addition, the resulting foam has a good thermal insulation with low thermal conductivity in a range of 0.03-0.08 W/(m·K).

In one embodiment, the firestop foam has a good adhesion on Portland cement substrate and galvanized mild steel. In order to reach good fire protection and smoke resistance, the filling depth of the flexible intumescent firestop foam should be 30 mm or above.

Both of flexible moisture-curable smokestop joint sealant and liquid-applied waterproof coating are moisture-curable materials, which include a liquid polymer resin with a viscosity ranging from 10,000 to 60,000 mPa·s, a plasticizer, a nano filler, a brightener, an UV absorber, a thermal stabilizer, a moisture scavenger, an adhesion promoter and an organotin catalyst.

In one embodiment, the flexible moisture-curable smokestop joint sealant and liquid-applied waterproof coating include by 100 parts of liquid polymer resin with a viscosity ranging from 10,000 to 60,000 mPa·s, 50-100 parts of plasticizer, 100-150 parts of nano filler, 10-30 parts of brightener, 0.5-2 parts of UV absorber, 0.5-2 parts of thermal stabilizer, 2-5 parts of moisture scavenger, 2-5 parts of adhesion promoter and 0.1-3 parts of organotin catalyst.

In one embodiment, the liquid polymer resin is a moisture-curable silylated liquid polymer resin, including silane terminated polyurethane prepolymer, silylated polyether prepolymer or their mixture. Market-available silane terminated polyether polymer resins, such as Kaneka MS Polymer™ S203H, Kaneka MS Polymer™ S303H, Kaneka MS Polymer™ 520SAX, Wacker GENIOSIL® STP-E10, Wacker GENIOSIL® STP-E15, Wacker GENIOSIL® STP-E30, Wacker GENIOSIL® STP-E35, RISUN® 120ES, RISUN® 120N, RISUN® T380, Desmoseal® S XP2458, SiSiB® STP-31020, SiSiB® STP 51280 and SiSiB® STP71280 are used to produce a super flexible smokestop joint sealant and liquid-applied waterproof coating. The silylated polyether prepolymer preferably selected from Kaneka Kaneka MS Polymer™ 520SAX, Wacker GENIOSIL® STP-E30, Wacker GENIOSIL® STP-E35, RISUN® T380, Desmoseal® S XP2458 and SiSiB® STP-31020.

In other embodiment, market-available silylated polyether, such as Kaneka MS Polymer™ 203H, Kaneka MS Polymer™ S303H, Wacker GENIOSIL® STP-E10, Wacker GENIOSIL® STP-E15, RISUN® 120ES, RISUN® 120N, SiSiB® STP 51280 and SiSiB® STP71280 are used to produce a liquid-applied waterproof coating.

In one embodiment, the plasticizer includes N-diisononyl phthalate (DINP), diethylhexyl phthalate (DEHP), phthalic acid diester (DBP) and phenyl 1-pentadecanesulfonate (Mesamoll).

In one embodiment, the nano-filler includes an organic surface-treated calcium carbonate nanoparticle with 60-120 nm particle size.

In one embodiment, the adhesion promoter includes (3-aminopropyl) trimethoxysilane, (3-aminopropyl) triethoxysilane, (3-Glycidyloxypropyl) trimethoxysilane, (3-Glycidyloxypropyl) triethoxysilane, N-2-aminoethyl-3-aminopropyltrimethoxy silane, N-2-aminoethyl-3-aminopropyl triethoxysilane, or their mixture.

In one embodiment, the moisture scavenger includes vinyltrimethoxysilane, vinyltriethoxysilane, or their mixture.

Benzotriazoles or Triazine ultraviolet light absorbers for UV protection and durability are used to protect and extend the lifetime of smokestop joint sealant and liquid-applied waterproof coating. The UV absorbers can be any market-available UV absorbers, such as TINUVIN® 234, TINUVIN® 326, TINUVIN® 327, TINUVIN® 329, TINUVIN® 360, TINUVIN® 460, TINUVIN® 477, TINUVIN® 770, TINUVIN® 384, TINUVIN® 1130, TINUVIN® 5050, TINUVIN® 5151, TINUVIN® 5060, or their mixture.

In one embodiment, the thermal stabilizer can be a commercial thermal stabilizer, such as TINUVIN® B75, Irgafos® 168 Irganox® 1010, Irganox® 1520, Irganox® B 225, Tinuvin® 765, Chinox® 7, Chinox® 168, and Chinox® TP-10.

In one embodiment, the catalyst used in the disclosure includes dibutyltindiacetate, dibutyltindilaurate or a combination thereof.

Certain embodiments of the present invention are now further illustrated with reference to the accompanied drawings as follows.

The following examples are provided to illustrate the invention, which by no means are exhaustive. They are intended to be illustrative only and are not intended to limit the scope of the invention.

EXAMPLES

Example 1

Figure 1A:
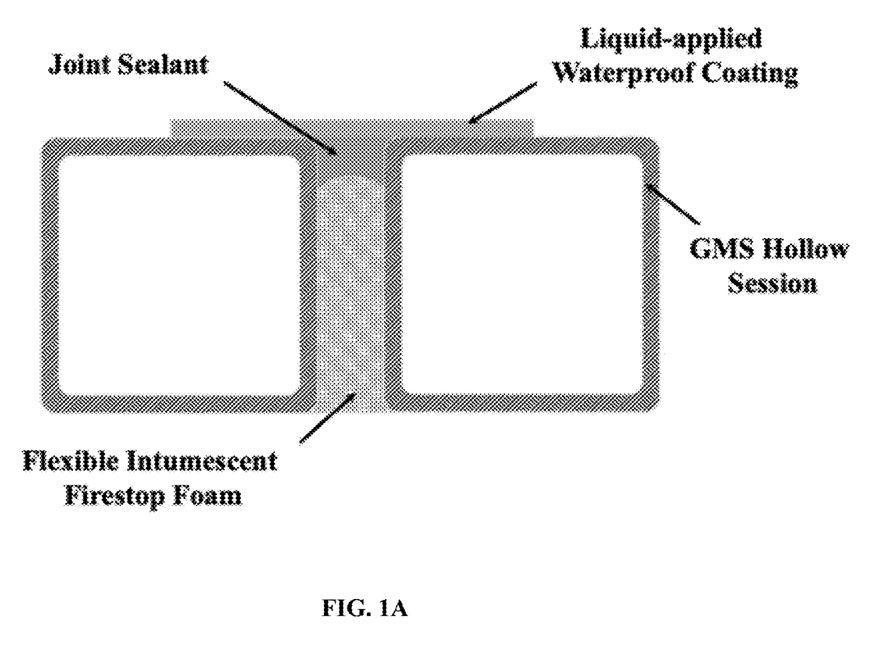
FIG. 1A shows a schematic view of a modular integrated construction joint in accordance with one embodiment of the present invention.

This invention relates to a seamless stitching system which provides a long-term waterproof and fire protection for the joint cavities (e.g. module-to-module joint cavity, module-to-wall joint cavity) in modular integrated construction. As shown in FIG. 1A, the seamless stitching system of the modular integrated construction joint includes an injectable intumescent firestop foam with closed cells; a flexible moisture-curable smokestop joint sealant on top of the firestop foam and a liquid-applied waterproof coating disposed on the joint sealant, thereby providing firestop and smokestop in one direction and waterproof in an opposite direction.

Example 2

Figure 1B:
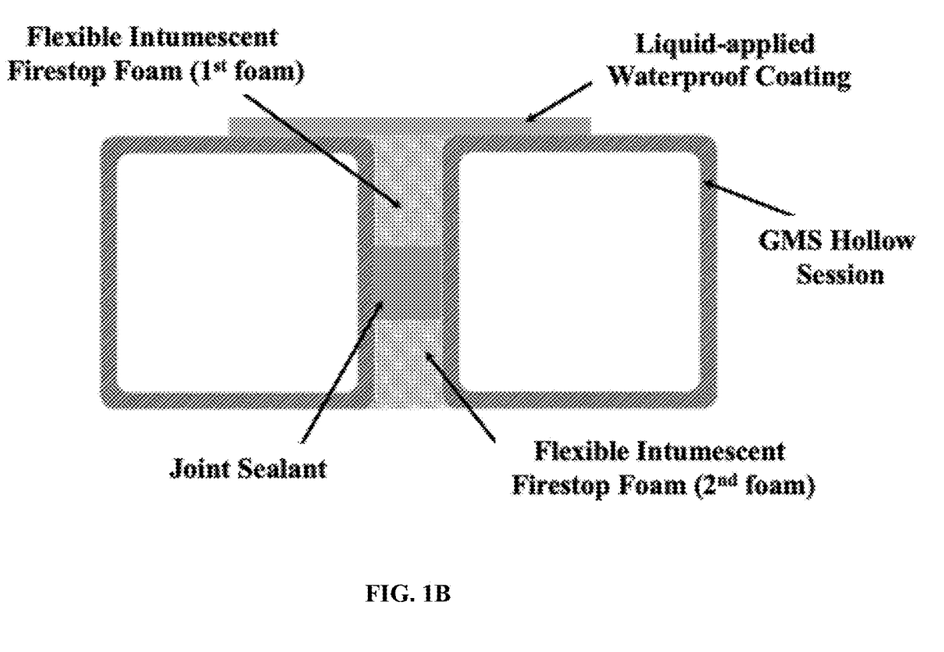
FIG. 1B shows a schematic view of a modular integrated construction joint in accordance with another embodiment of the present invention.

Referring to FIG. 1B, the seamless stitching system of the modular integrated construction joint includes a directly applied first injectable intumescent firestop foam with closed cells; a second injectable intumescent firestop foam; a flexible moisture-curable smokestop joint sealant between the first and second flexible intumescent firestop foam and a liquid-applied waterproof coating disposed on top of the first flexible intumescent firestop foam, thereby providing waterproof in one direction, while firestop and smokestop in both directions.

Example 3

Figure 1C:
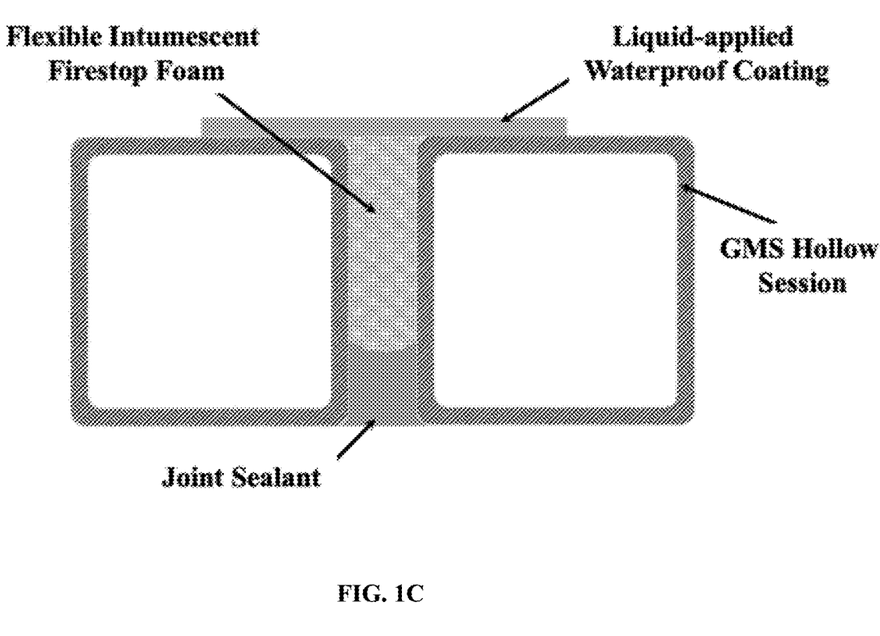
FIG. 1C shows a schematic view of a modular integrated construction joint in accordance with yet another embodiment of the present invention.

Referring to FIG. 1C, the smokestop joint sealant and liquid-applied waterproof coating can also be respectively constructed on both sides of PU foam to form a sandwich structure. The seamless stitching system of the modular integrated construction joint includes a flexible moisture-curable smokestop joint sealant; an injectable intumescent firestop foam with a closed cell structure on top of the joint sealant and a liquid-applied waterproof coating disposed on surface of the injectable intumescent firestop foam, thereby providing smoke resistance in one direction, firestop in the core and water resistance in the opposite direction.

Example 4

Flexible Smokestop Joint Sealant and Liquid-Applied Waterproof Coating Preparation Flexible smokestop joint sealant and liquid-applied waterproof coating were made by using a vacuum planetary mixer. Firstly, surface-treated calcium carbonate nanofillers, a $TiO_2$ brightener, an UV absorber and a thermal stabilizer were added into the mixture of modified polyether polymer and plasticizer, and then mixed for 30 min under room temperature and constant pressure to obtain a paste. Then, the mixing step was continued under vacuum, and the temperature was set to 90-120° C. for 2 hours to obtain a base material. The base material was cooled down under vacuum below 60° C. followed by adding silane coupling agents (e.g. moisture scavenger and adhesion promoter) into the base material, and then mixing them at a high speed under vacuum for 30 minutes. The mixture could be further cooled below 50° C. Next step, a catalyst was added into the mixture under nitrogen-protection atmosphere and mixed for another 10 minutes. Finally, the mixture was dispersed at a high speed under vacuum for another 20-60 minutes before obtaining the final product. As the waterproof coating was a liquid-based material, it could be easily applied via a brush, roll or spray, and it is easy to spread without the need for smoothing out like sheet membrane does.

The nanofiller-containing smokestop joint sealant has a fracture elongation of at least 700%, a movement accommodation capability of at least ±25% and an excellent durability. It also exhibits a strong adhesion on galvanized mild steel with at least 1.0 MPa of tensile adhesion strength.

The brushable waterproof coating has a fracture elongation of at least 400%, a tensile strength of at least 2.0 MPa and a tensile adhesion strength of at least 1.0 MPa. As the waterproof coating is a liquid-based material, it can be fit into small spaces such as hard to reach corners for a full and even finish, and therefore providing a reliable and resilient waterproof protection for the module-to-module joint cavity.

In the disclosure, the seamless stitching system had a movement accommodation capability of ±25% and ±50% on cement mortar and GMS, respectively, which could resist a water pressure of 5 bar over 72 hours during DIN 1048 test without water leakage. A flame test was conducted on the resulting seamless stitching system through a gas torch with a burner diameter of 1.5 inches and a flame temperature of over 1000° C. The result showed that the seamless stitching system was capable of withstanding flame temperature of at least 1000° C. for at least one hour. The system also satisfied the integrity and insulation requirements after a heating period of 90 minutes when testing in accordance with BS 476: Part 20: 1987.

Example 5

Physical Performance of the Seamless Stitching System in Examples 1-3

Table 1 shows examples and physical performance of a flexible intumescent firestop foam in the present invention, as shown below. All constituents are represented in parts by weight ratio.

TABLE 1

| Component | | | Example 1 | Example 2 | Example 3 | Example 4 | Example 5 |
|---|---|---|---|---|---|---|---|
| Flexible intumescent firestop foam | Polyol mixture | Basic polyether polyol | 100 | 100 | 100 | 100 | 100 |
| | | Water | 2 | 2.5 | 3 | 1 | 2.5 |
| | | Intumescent flame retardant agent | 70 | 70 | 80 | 56 | 70 |
| | | Thermal insulation filler | 5 | 5 | 0 | 5 | 5 |
| | | Chain extender | 0.5 | 0 | 0 | 0.4 | 0.5 |
| | | Foam stabilizer | 0.5 | 0.5 | 0.5 | 0.2 | 0.5 |
| | | UV absorber | 0.3 | 0.3 | 0.3 | 0.3 | 0.3 |
| | | Thermal stabilizer | 0.3 | 0.3 | 0.3 | 0.3 | 0.3 |
| | | Catalyst | 1.0 | 0.75 | 0.5 | 0.5 | 0.75 |
| | Isocyanate compound | Isocyanate prepolymer | 46.8 | 45.0 | 52.0 | 30 | 45 |
| Physical performances | | Density (g/cm³) | 0.10 | 0.08 | 0.065 | 0.16 | 0.08 |
| | | Thermal conductivity (W/(K·m)) | 0.045 | 0.048 | 0.035 | 0.073 | 0.061 |
| | | Flame retardant (BS 476 part 7) | Class 2 | Class 2 | Class 2 | Class 2 | Class 2 |

As shown in Table 1, the density of the resulting flexible polyurethane foam were about 0.065-0.16 g/cm³, the thermal conductivities were about 0.035-0.073 W/(K·m), and the fire performance of firestop foam was classified as Class 2 according to EN BS 476 part 7.

The seamless stitching system for modular integrated construction also further includes a liquid-applied flexible smokestop joint sealant and a waterproof coating disposed on the surface of firestop foam. Table 2 showed compositions of liquid-applied flexible smokestop joint sealant and waterproof coating.

TABLE 2

| Product | Component | Weight % |
|---|---|---|
| Smokestop joint sealant | Silyl terminated polyether with viscosity of 35,000-55,000 mPa · s | 100 |
|  | Plasticizer | 90-100 |
|  | Nano filler | 110-150 |
|  | Brightener | 15-30 |
|  | UV absorber | 0.5-1.0 |
|  | Thermal stabilizer | 0.5-1.0 |
|  | Moisture scavenger | 2.0-4.5 |
|  | Adhesion promoter | 2.0-4.5 |
|  | Catalyst | 0.5 |
| Liquid-applied waterproof coating | Silyl terminated polyether with viscosity of 10,000-30,000 mPa · s | 100 |
|  | Plasticizer | 60-90 |
|  | Nano filler | 130-150 |
|  | Brightener | 15-30 |
|  | UV absorber | 0.5-1.0 |
|  | Thermal stabilizer | 0.5-1.0 |
|  | Moisture scavenger | 2.0-4.5 |
|  | Adhesion promoter | 2.0-4.5 |
|  | Catalyst | 2.0 |

As shown in Table 2, the smokestop joint sealant includes 100 parts by weight of silyl terminated polyether, 90-100 parts of plasticizer, 110-150 parts of nano filler, 15-30 parts of brightener, 0.5-1.0 parts of UV absorber, 0.5-1.0 parts of thermal stabilizer, 2.0-4.5 parts of moisture scavenger, 2.0-4.5 parts of adhesion promoter and 0.5 part of catalyst. The liquid-applied waterproofing coating includes 100 parts by weight of silyl terminated polyether, 60-90 parts of plasticizer, 110-150 parts of nano filler, 15-30 parts of brightener, 0.5-1.0 parts of UV absorber, 0.5-1.0 parts of thermal stabilizer, 2.0-4.5 parts of moisture scavenger, 2.0-4.5 parts of adhesion promoter and 2 parts of catalyst.

For further illumination of the performance of the resulting liquid-applied smokestop joint sealant and waterproof coating fabricated in the Examples, some tests were carried out in accordance with international standards, and the results were shown in Table 3.

TABLE 3

| Specimen | Elongation at break before AWT (%) | Tensile Strength before AWT (MPa) | Elongation at break after AWT (%) | Tensile Strength after AWT (MPa) | Tensile adhesion strength on mortar (MPa) | Tensile adhesion strength on GMS (MPa) |
|---|---|---|---|---|---|---|
| Smokestop joint sealant | 763 | 2.41 | 858.8 | 2.97 | 0.68 | 1.50 |
| Liquid-applied waterproof coating | 686.7 | 2.08 | 664.5 | 2.13 | 0.95 | 1.52 |

AWT: accelerated weatherablity test

Table 3 showed physical properties of smokestop joint sealant and waterproof coating of the present application. The tensile performances of the smokestop joint sealant and waterproof coating were characterized by a universal testing system according to ASTM D412. As shown in Table 3 and FIG. 2, the fracture elongation and tensile strength of the smokestop joint sealant were 763.0% and 2.41 MPa, respectively.

Figure 2:
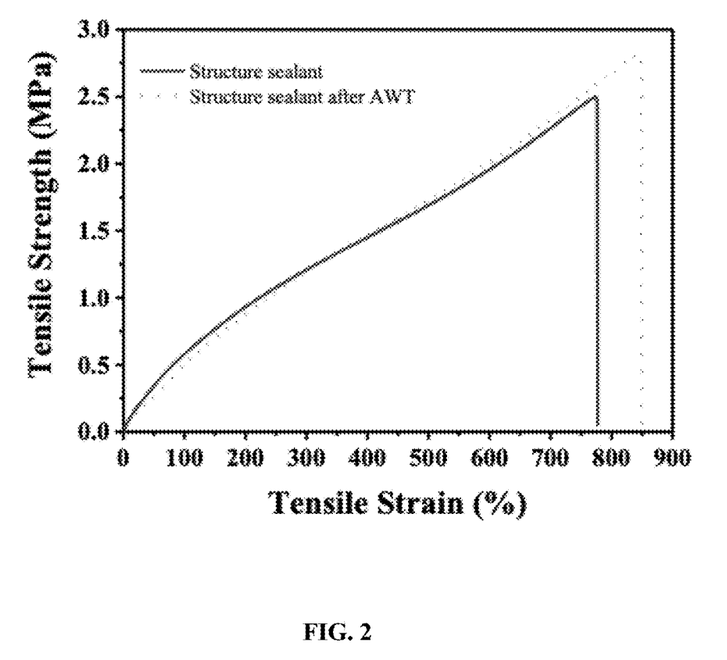
FIG. 2 shows tensile behaviors of a smokestop joint sealant before/after accelerated weathering test (AWT)

Furthermore, in order to evaluate the durability, the sealant samples were placed in an UV chamber to simulate outdoor accelerated weathering process, referring to ASTM C 1519 for 2500 hours. The detail exposure condition was listed as following: performing ASTM G154 cycle 6 test, using an UVA-340 lamp with 340 nm wavelength, 0.89 W/m$^2$/nm irradiance, and the exposure cycle containing irradiating UV for 8 hours at 60° C. black panel temperature; condensing at 50° C. black panel temperature for 4 hours. Even after accelerated weathering test (AWT), the smokestop joint sealant still exhibited excellent resilience with 858% elongation and 2.97 MPa tensile strength. In addition, the smokestop joint sealant also exhibited 0.68 MPa and 1.50 MPa adhesion strength on mortar and GMS, respectively.

Figure 3:
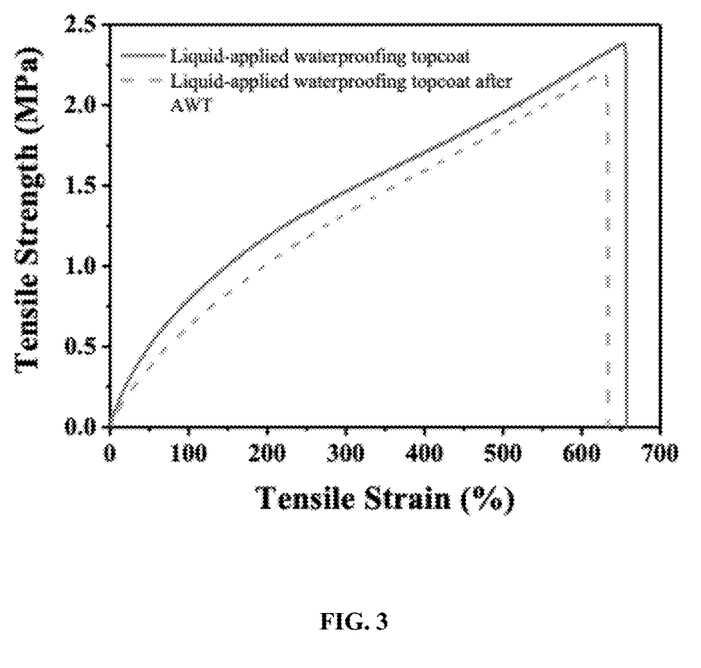
FIG. 3 shows tensile behaviors of a liquid-applied waterproof coating before/after accelerated weathering test (AWT)

As shown in Table 3 and FIG. 3, the fracture elongation and tensile strength of the waterproof coating were 686.7% and 2.08 MPa, respectively. Even after accelerated weathering test (AWT), the elongation at break and tensile strength of the waterproof coating could still reach 664% and 2.13 MPa. In addition, the waterproof coating also exhibited 0.95 MPa and 1.52 MPa adhesion strength on mortar and GMS, respectively.

In addition, market-available sealant products (sealant A, sealant B, sealant C) and liquid-applied waterproof coatings (coating D and coating E) were also tested for their physical properties in Table 4. First, sealant A and B had high flexibility, tensile strength and good bonding strength, but their UV/weathering resistance were very poor. After accelerated weathering testing, their elasticity decreased significantly. Second, sealant C had high flexibility and good UV/weathering resistance, but its adhesion strength on either cementitious substrate or GMS was very poor.

TABLE 4

| Specimen | Elongation at break before AWT (%) | Tensile Strength before AWT (MPa) | Elongation at break after AWT (%) | Tensile Strength after AWT (MPa) | Tensile adhesion strength on mortar (MPa) | Tensile adhesion strength on GMS (MPa) |
|---|---|---|---|---|---|---|
| Sealant A | 567.9 | 1.79 | 418.5 | 1.86 | 0.61 | 0.87 |
| Sealant B | 733.0 | 2.31 | 428.4 | 3.33 | 1.11 | 0.51 |
| Sealant C | 812.7 | 1.38 | 773.2 | 0.86 | 0.38 | 0.40 |
| Coating D | 344.7 | 1.52 | 102.3 | 3.20 | 1.20 | 1.29 |
| Coating E | 578.9 | 2.65 | 197.6 | 1.23 | 0.74 | 0.81 |

As shown in Table 4, the elasticity of both market-available waterproof coatings D and E decreased significantly, which lead to cracking of the waterproof coatings and water leakage in buildings. The durability of coating D or coating E is very poor. Compared to commercial waterproof coatings and smokestop joint sealants, both the smokestop joint sealant and liquid-applied waterproof coating of the present invention had both had high flexibility, high strength, excellent UV and weather resistance and strong adhesion on cement mortar and GMS.

The movement accommodation capability (MAC) of the liquid-applied smokestop joint sealant and waterproof coating was tested by using a compression-extension machine referring to ASTM C719, as shown in Table 5. It could be seen that the smokestop joint sealant and waterproof system exhibited ±25% and ±50% of movement accommodation capability on cement mortar and GMS, respectively. After cyclic compression-extension testing, no defects were found on the testing specimens.

TABLE 5

| Specimen | MAC on cement mortar | MAC on GMS |
| --- | --- | --- |
| Smokestop joint sealant | ±25% | ±50% |
| Liquid-applied waterproof coating | ±25% | ±50% |
| Liquid-applied smokestop and waterproof system | ±25% | ±50% |

MAC: movement accommodation capability

Example 6

Figure 4:
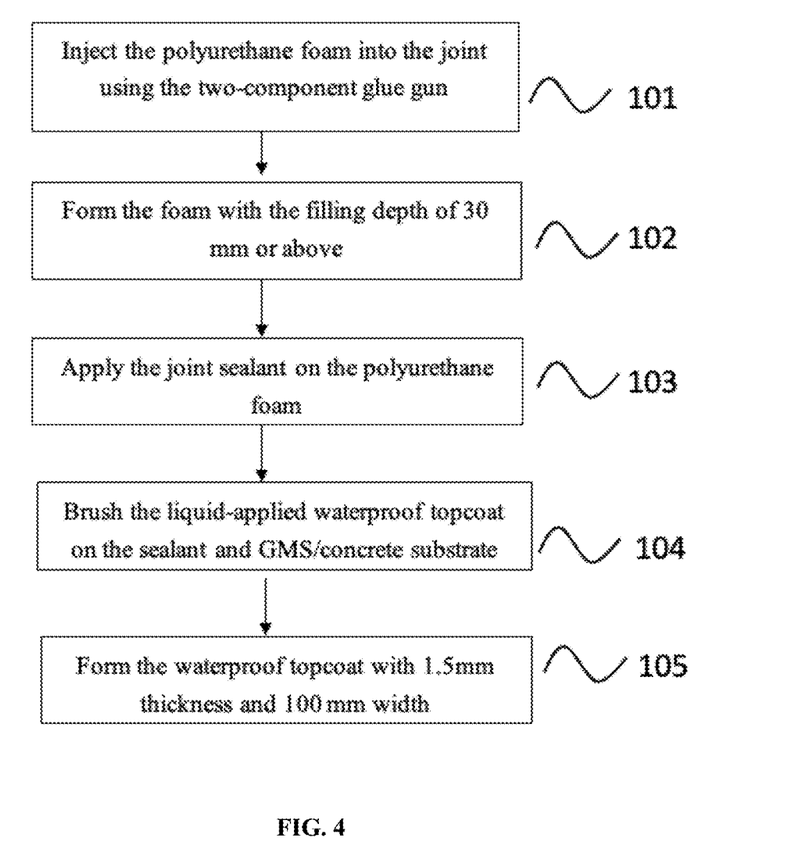
FIG. 4 shows an application process of seamless stitching system for MiC connection joint.

Application Process of the Seamless Stitching System for the Joint Cavity in MiC Referring to FIG. 4, in step 101 and 102, the flexible intumescent firestop foam was injected into a module-to-module joint cavity or a module-to-wall joint cavity by using a two-component glue gun with over 30 mm filling depth, and then the smokestop joint sealant was applied on the polyurethane foam (step 103). The filling depth of the smokestop joint sealant should be half of the joint width or above. In step 104 and step 105, when the sealant was tack-free, the liquid-applied waterproof coating was directly brushed on the sealant and GMS/concrete substrate with a thickness of 1.5 mm and a width of 100 mm.

Figure 5:
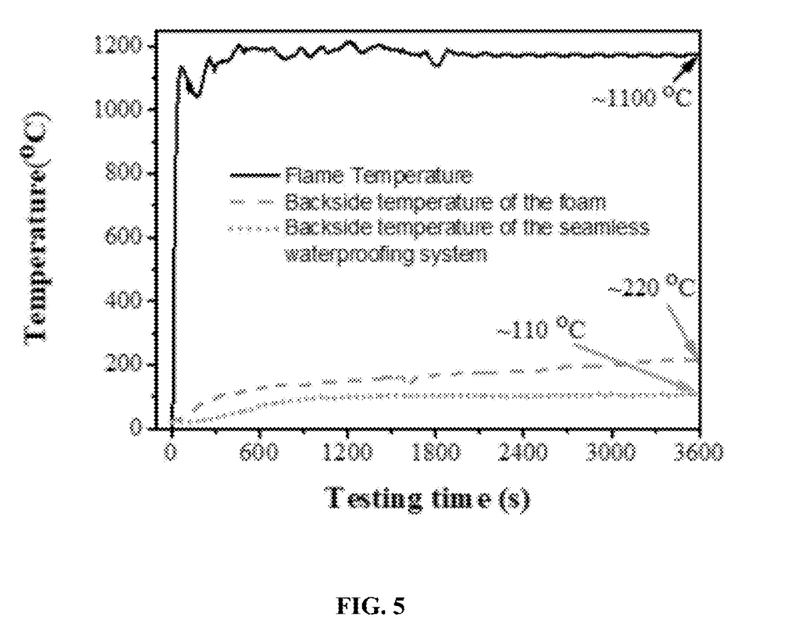
FIG. 5 shows a temperature of the flame and back side temperatures of the seamless stitching system in accordance with one embodiment of the present invention.

A flame test was conducted on the resulting foams through a gas torch with a burner diameter of 1.5 inches and a flame temperature of over 1000° C. Meanwhile, the backside temperatures of the foams and the waterproof coating were measured. As shown in FIG. 5, the seamless stitching system of the modular integrated construction joint was capable of withstanding the flame temperature for at least one hour and maintaining the structural integrity of the smokestop joint sealant and waterproof coating. The fire resistance of the seamless stitching system was also conducted in accordance with BS part 20:1987. The specimen for flame test had overall dimensions of 180 mm wide, by 1,200 mm high, by 100 mm deep and was filled by 20 mm wide and 80 mm depth of seamless stitching system in the present invention, while market-available firestop system consists of a firestop sealant and a backer rod at the gap between 2 nos. of 80 mm×80 mm×6 mm thick GMS hollow sections. The GMS hollow section was projected with a nominal 20 mm deep of fire rate board.

Figure 6:
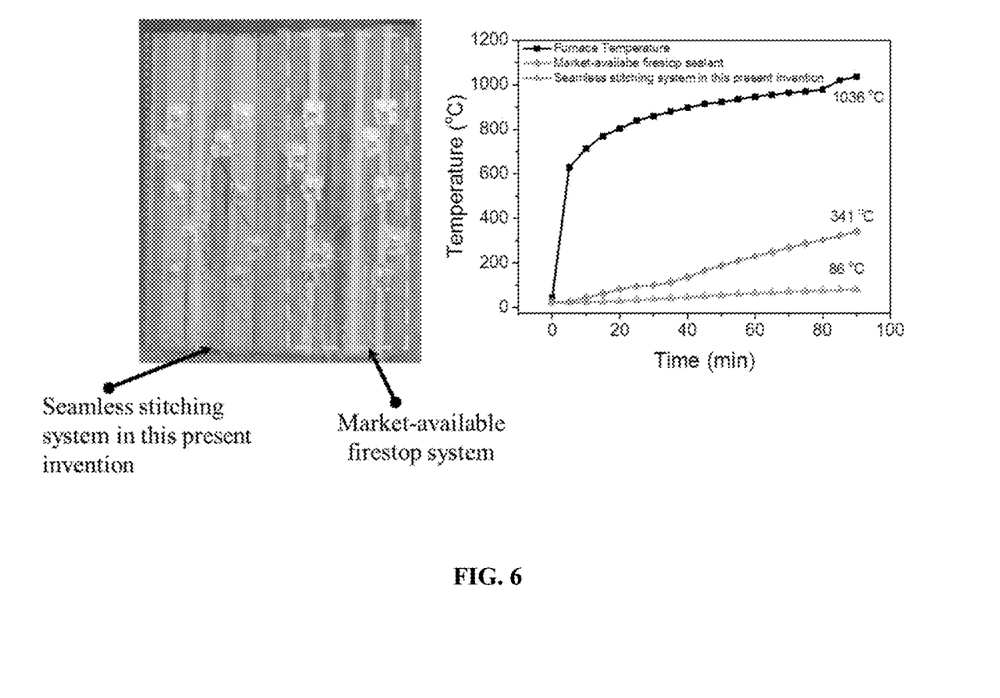
FIG. 6 shows the changes in temperature in the furnace, market-available firestop system and the seamless stitching system in the present invention when tested in accordance with BS 476: Part 20: 1987.

As shown in FIG. 6, it could be seen that the seamless stitching system had a higher thermal insulation than the market-available system. The seamless stitching system in the present invention satisfied the integrity and insulation requirements after a heating period of 90 minutes, when tested in accordance with BS 476: Part 20: 1987.

Furthermore, when testing according to DIN 1048 Part 5, the seamless stitching system of the present invention could resist to 5 bar of water pressure in a period of over 72 hours, providing fire and smoke resistance in one direction and water resistance in the opposite direction.

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

What is claimed is:

1. A modular integrated construction joint comprising:
   a first building module;
   a second building module or a structural wall;
   a joint between the first building module and the second building module or the structural wall including a flexible seamless stitching system having high fire resistance and smoke resistance in one direction and high water resistance in an opposite direction, the stitching system comprising:
   an injectable flexible intumescent firestop foam with a closed cell structure, wherein the flexible intumescent firestop foam has a filling depth of at least 30 mm, and the flexible intumescent firestop foam has a thermal conductivity in a range of 0.03-0.06 W/(m·K), wherein the flexible intumescent firestop foam has a density in a range of 0.05 g/cm$^3$ to 0.15 g/cm$^3$;
   a flexible moisture-curable smokestop joint sealant on top of the flexible intumescent firestop foam with a fracture elongation of at least 700%, wherein the smokestop joint sealant has a filling depth that is at least half of the joint width, a tensile strength of at least 1.5 MPa, and a tensile adhesion strength of at least 0.5 MPa; and
   a liquid-applied waterproof coating disposed on the smokestop joint sealant, wherein the liquid-applied waterproof coating has a fracture elongation of at least 400%, a tensile strength of at least 1.5 MPa of tensile strength, and a tensile adhesive strength of at least 0.8 MPa;
wherein the flexible seamless stitching system has a movement accommodation capability of approximately 20% to 50%;
wherein the flexible seamless stitching system can accommodate an irregular joint surface; and
wherein the seamless stitching system resists to 0.5 MPa of water pressure for over 72 hours without water leakage, and is capable of withstanding flame temperature of over 600° C. for more than two hours, and withstanding flame temperature of over 1000° C. for more than one hour.

2. The modular integrated construction joint of claim 1, wherein the flexible intumescent firestop foam is a two-component injectable/spreadable, halogen-free, water-blown, flame-retardant and flexible polyurethane foam.

3. The modular integrated construction joint of claim 2, wherein the flexible intumescent firestop foam comprises a flame retardant polyol mixture and an isocyanate compound.

4. The modular integrated construction joint of claim 3, wherein the isocyanate compound is selected from one or more of aromatic polyisocyanates, aliphatic polyisocyanates, cycloaliphatic polyisocyanates, heterocyclic polyisocyanates, toluene diisocyanate (TDI), methylene diphenyl diisocyanate (MDI), or a combination thereof; and wherein the isocyanate compound has an NCO content of 15 to 50 wt %.

5. The modular integrated construction joint of claim 3, wherein the flame retardant polyol mixture comprises:
100 parts by weight of polyether polyol;
1 to 5 parts of water;
30 to 150 parts of flame retardant agent;
0 to 10 parts of thermal insulation filler;
2 to 6 parts of chain extender;
0.1 to 1.0 parts of silicon foam stabilizer;
0.3 to 1.0 parts of UV absorber;
0.1 to 5 parts of thermal stabilizer; and
0.1 to 3.0 parts of catalyst.

6. The modular integrated construction joint of claim 5, wherein the polyether polyol comprises a hydroxyl value of 20 to 60 mg KOH/g and a flame retardant polyol.

7. The modular integrated construction joint of claim 5, wherein the thermal insulation filler comprises hollow glass beads, hollow ceramic beads and silica aerogel powder.

8. The modular integrated construction joint of claim 5, wherein the chain extender is a low-molecular-weight glycol selected from 1,4-butanediol, propylene glycol, or diethylene glycol.

9. The modular integrated construction joint of claim 5, wherein the catalyst comprises metallic compounds and tertiary amines.

10. The modular integrated construction joint of claim 1, further comprising a flame retardant agent infused into the flexible intumescent firestop foam selected from one or more of expanded graphite, magnesium hydroxide, ammonium polyphosphate, aluminum oxides, hydroxides, iron compounds, molybdenum trioxide or mixtures, nitrogen-based compounds, water-based aluminum trihydrate, or a combination thereof.

11. The modular integrated construction joint of claim 1, wherein both the smokestop joint sealant and the liquid-applied waterproof coating further comprise:
a moisture-curable liquid polymer resin with a viscosity ranging from 10,000 to 60,000 mPa·s;
a plasticizer;
a nano filler;
an UV absorber;
a thermal stabilizer;
a moisture scavenger;
an adhesion promoter; and
a catalyst.

12. The modular integrated construction joint of claim 11, wherein the moisture-curable liquid polymer resin is selected from one or more of silane terminated polyurethane prepolymer, silylated polyether prepolymer, or a combination thereof.

13. The modular integrated construction joint of claim 11, wherein the nano-filler comprises an organic surface-treated calcium carbonate nanoparticle.

14. The modular integrated construction joint of claim 11, wherein the moisture scavenger is selected from one or more of vinyltrimethoxysilane, vinyltriethoxysilane, or a combination thereof.

15. The modular integrated construction joint of claim 11, wherein the adhesion promoter is selected from one or more of (3-aminopropyl) trimethoxysilane, (3-aminopropyl) triethoxysilane, (3-Glycidyloxypropyl) trimethoxysilane, (3-Glycidyloxypropyl) triethoxysilane, N-2-aminoethyl-3-aminopropyltrimethoxysilane, N-2-aminoethyl-3-aminopropyltriethoxysilane, or a combination thereof.

16. The modular integrated construction joint of claim 1, wherein the irregular surface comprises corner, joints, or any shape of surface.

17. A modular integrated construction joint comprising:
a first building module;
a second building module or a structural wall;
a joint between the first building module and the second building module or structural wall including a flexible seamless stitching system having high water resistance in one direction and high fire resistance and smoke resistance in both directions, the stitching system comprising:
a first injectable flexible intumescent firestop foam with a closed cell structure, wherein the flexible intumescent firestop foam has a filling depth of at least 30 mm, and the flexible intumescent firestop foam has a thermal conductivity in a range of 0.03-0.06 W/(m·K), wherein the flexible intumescent firestop foam has a density in a range of 0.05 g/cm$^3$ to 0.15 g/cm$^3$;
a second injectable flexible intumescent firestop foam with a closed cell structure, wherein the flexible intumescent firestop foam has a filling depth of at least 30 mm, and the intumescent firestop foam has a thermal conductivity in a range of 0.03-0.06 W/(m·K);
a flexible moisture-curable smokestop joint sealant between the first and second flexible intumescent firestop foam, wherein the first flexible intumescent firestop foam, the joint sealant, and the second flexible intumescent firestop foam are arranged from top to bottom, and wherein the smokestop joint sealant has a fracture elongation of at least 700%, a filling depth that is at least half of the joint width, a tensile strength of at least 1.5 MPa, and a tensile adhesion strength of at least 0.5 MPa; and
a liquid-applied waterproof coating disposed on top of the first flexible intumescent firestop foam, wherein the liquid-applied waterproof coating has a fracture elongation of at least 400%, a tensile strength of at least 1.5 MPa of tensile strength, and a tensile adhesive strength of at least 0.8 MPa;

wherein the seamless stitching system has a movement accommodation capability of approximately 20% to 60%;

wherein the flexible seamless stitching system can accommodate an irregular joint surface; and wherein the seamless stitching system resists to 0.5 MPa of water pressure for over 72 hours without water leakage, and is capable of withstanding flame temperature of over 600° C. for more than two hours, and withstanding flame temperature of over 1000° C. for more than one hour.

18. A modular integrated construction joint comprising:
a first building module;
a second building module or a structural wall;
a joint between the first building module and the second building module or structural wall including a flexible seamless stitching system having high fire resistance in one direction, firestop in the core and high water resistance in an opposite direction, the stitching system comprising:

a flexible moisture-curable smokestop joint sealant with a fracture elongation of at least 700%, wherein the smokestop joint sealant has a filling depth that is at least half of the joint width, a tensile strength of at least 1.5 MPa, and a tensile adhesion strength of at least 0.5 MPa;

an injectable flexible intumescent firestop foam with a closed cell structure on top of the joint sealant, wherein the flexible intumescent firestop foam has a filling depth of at least 30 mm, and the intumescent firestop foam has a thermal conductivity in a range of 0.03-0.06 W/(m·K), wherein the flexible intumescent firestop foam has a density in a range of 0.05 g/cm$^3$ to 0.15 g/cm$^3$; and a liquid-applied waterproof coating disposed on surface of the injectable intumescent firestop foam, wherein the liquid-applied waterproof coating has a fracture elongation of at least 400%, a tensile strength of at least 1.5 MPa of tensile strength, and a tensile adhesive strength of at least 0.8 MPa;

wherein the seamless stitching system has a movement accommodation capability of approximately 20% to 50%;

wherein the flexible seamless stitching system can accommodate an irregular joint surface; and wherein the seamless stitching system resists to 0.5 MPa of water pressure for over 72 hours without water leakage, and is capable of withstanding flame temperature of over 600° C. for more than two hours, and withstanding flame temperature of over 1000° C. for more than one hour.

* * * * *